United States Patent [19]

Parker et al.

[11] Patent Number: 5,348,760
[45] Date of Patent: Sep. 20, 1994

[54] SURFACE TREATED CERAMIC POWDERS

[75] Inventors: Anthony A. Parker, Toledo, Ohio; Edward M. Anderson, Roland, Ark.; Todd T. Stanzione, Sarver, Pa.

[73] Assignee: Aluminum Company of America, Pittsburgh, Pa.

[21] Appl. No.: 134,777

[22] Filed: Oct. 12, 1993

[51] Int. Cl.$^5$ .............................. B05D 7/00
[52] U.S. Cl. ........................... 427/9; 264/63; 264/340; 264/344; 427/221; 427/387; 524/261; 524/430
[58] Field of Search ............ 264/63, 340, 344; 427/9, 221, 387; 524/261, 430

[56] References Cited

U.S. PATENT DOCUMENTS

| | | | |
|---|---|---|---|
| 2,966,719 | 1/1961 | Park | 25/156 |
| 3,963,627 | 6/1976 | Cottrell | 428/405 X |
| 4,671,928 | 6/1987 | Herron et al. | 427/97 X |
| 4,772,346 | 9/1988 | Anderson, Jr. et al. | 156/89 |
| 4,845,004 | 7/1989 | Kobayashi | 430/110 |
| 4,925,492 | 5/1990 | Kelkar et al. | 106/38.35 |
| 4,950,502 | 8/1990 | Saam et al. | 427/221 X |
| 5,001,091 | 3/1991 | Pujari et al. | 501/103 |
| 5,061,548 | 10/1991 | Arthur et al. | 428/208 |
| 5,183,710 | 2/1993 | Gerbino | 427/221 X |
| 5,207,968 | 5/1993 | Phelps et al. | 264/344 |
| 5,252,655 | 10/1993 | Parker et al. | 524/430 |

Primary Examiner—Michael Lusignan
Attorney, Agent, or Firm—David W. Pearce-Smith

[57] ABSTRACT

A method of reducing the agglomeration of ceramic powder materials, the method comprising: (a) providing a ceramic powder comprising ceramic particles; (b) coating the ceramic particles with a solution containing from 0.05-0.5 wt. % of a polysiloxanol oligomer of a trialkoxysiloxane monomer having the structure $$Si(OR')_3$$

wherein R' represents a lower $C_1$-$C_4$ alkoxy group selected from the group consisting of methoxy, ethoxy, isopropoxy and n-butoxy and wherein the oligomer has chains having a number average distribution with a number average degree of polymerization $X_n$ in the range above 2 but below that near the gel point; and (c) drying the ceramic powder.

18 Claims, No Drawings

SURFACE TREATED CERAMIC POWDERS

TECHNICAL FIELD

The present invention relates to methods for treating the surface of ceramic and inorganic powdered materials. More particularly, the method of the present invention relates to the surface treatment of alumina to increase the fluidity of the powder and to increase the ability of the powder to disperse into slips and slurries.

BACKGROUND ART

Powdered ceramic raw materials and other inorganic powdered materials are often shipped in bulk great distances. During such transportation, the powder agglomerates and often the agglomerates become compacted. Once the bulk "powders" reach their destination, there is typically a need for the powders to exhibit good dry flow characteristics so that they can be transferred to different receptacles for storage until such time as they are to be used.

In addition, the key to making high quality homogeneous green ceramic bodies is to have a high density with oxide ceramic particles as nearly perfectly packed as practical. Attaining such a high density requires an excellent dispersion of the particles in the solvent(s) used to make a slip from which the green ceramic body is formed.

One can only obtain maximum green density with maximum sediment density which results in a correspondingly dense cast slip having optimum packing of particles. To obtain optimum packing one must use particles with as narrow a size distribution as possible, allow them to settle slowly out of suspension and to do so without agglomeration. To prevent agglomeration, the dispersant generates repulsion between adjacent particles. Such repulsion is provided by a mechanism referred to as "charge stabilization". An alternative is to provide "steric stabilization" by which polymers attach to particle surfaces forming "clouds" around the particles. When particles approach each other, the overlap of the polymer cloud provides an osmotic pressure which keeps the particles apart.

In the past, various organics materials, such as fish oil, have been added to slips and slurries to deflocculate them and thus change their viscosity. In copending U.S. Ser. No. 07/851,610, now U.S. Pat. No. 5,252,655, a hydrolyzed siloxane was used as an addition to a ceramic slurry used to make green tape for the production of multilayer ceramic packages. The teaching of U.S. Ser. No. 07/851,610 is incorporated herein by reference.

The primary object of the present invention is to provide a new method for reducing the agglomeration of ceramic powders.

Another objective of the present invention is to provide coated ceramic particles which do not require deflocculation after the ceramic particles have been added to slips or slurries.

Another objective of the present invention is to provide a coated ceramic particle which exhibits improved dry flow characteristics.

Still another objective of the present invention is to provide a coated ceramic particle which has increased sedimentation density.

These and other objects and advantages of the present invention will be more fully understood and appreciated with reference to the following description.

SUMMARY OF THE INVENTION

A method of reducing the agglomeration of ceramic powder materials, the method comprising: (a) providing a mass of ceramic particles; (b) coating the ceramic particles with a solution containing from 0.05–0.5 wt. % of a polysiloxanol oligomer of a trialkoxysiloxane monomer having the structure $$Si(OR')_3$$

wherein R' represents a lower $C_1$-$C_4$ alkoxy group selected from the group consisting of methoxy, ethoxy, isopropoxy and n-butoxy; and wherein the oligomer has chains having a number average distribution with a number average degree of polymerization $X_n$ in the range above 2 but below that near the gel point; and (c) drying the ceramic powder. The coated powder can then be used in subsequent ceramic processing such as dry pressing, isostatic pressing, hot pressing and plastic forming methods such as extrusion, pressing, wet pressing, jiggering, ram pressing, injection molding, casting (of slips and slurries) and doctor blading to form thin and thick films.

In a preferred embodiment of the invention, a prehydrolyzed triethoxyalkylsilane coating is placed on powdered ceramic raw materials. The silane has an alkyl moiety of sufficient hydrocarbon chain length to impart lubricating effect on the particle surface. The prehydrolysis insures sufficient adsorption when the particles are placed into a slip or slurry formed from an environmentally acceptable solvent such as water or ethanol. The use of prehydrolyzed silanes provides a silanol anchor group to aid in subsequent ceramic processing steps, such as a sintering aid during firing, since $SiO_2$ is the primary degradation product.

MODE FOR CARRYING OUT THE INVENTION

It has been discovered that the use of a hydrolyzed siloxane (also referred to as a "prehydrolyzed silane" to emphasize the requirement that the silane be hydrolyzed prior to addition to the dispersion of particles in solvent) which generates a polysiloxanol oligomer (hereafter "oligomer" for brevity) to form a coating on ceramic particles prior to incorporation into a ceramic slip or slurry has significant advantages over the uncoated particles. It has been discovered that when ceramic particles are pretreated with less than about 2 wt. % of polysiloxanol oligomer (based on the weight of particles) of a di- or trialkoxysilane monomer having a chosen organofunctional group, the particles exhibit improved dry flow characteristics over the same ceramic particles that have not been so treated. Those skilled in the art will recognize that the increase in dry flow performance in powders is an indication that the particles which form the powders are not agglomerated.

It has also been discovered that when ceramic particles are pretreated with less than about 2 wt. % of polysiloxanol oligomer (based on the weight of particles) of a di- or trialkoxysilane monomer having a chosen organofunctional group, the particles exhibit improved higher loose and packed density over the same ceramic particles that have not been so treated. Those skilled in the art will recognize that higher densities in ceramic powders are indications that the particles are not agglomerated.

Furthermore, it has been discovered that when a slurry is formed from ceramic particles which have been pretreated with less than about 2 wt. % of polysiloxanol oligomer (based on the weight of particles) of a di- or trialkoxysilane monomer having a chosen organofunctional group, the particles settle more slowly, and the volume of the sediment has a density higher than that of sediment from a dispersion of the same particles in the same solvent mixed with the monomeric silane from which the oligomer was formed.

It has also been discovered that the disparate effect of the combination of the organofunctional group and the available silicon-bonded OH groups in a polysiloxanol oligomer on different sizes of oxide ceramic and glass particles in the range from about 1–10 μm, and mixtures of particles in that range, results in a sediment which is greater than the cumulative densities of sediments of each material using the same amount of polysiloxanol in the same solvent.

Further still, it has been discovered that When a hydrolyzed organosilane is allowed to form an oligomer with chains having a number average distribution with a number average degree of polymerization in the range above 2 but below that near the gel point, many of which chains have silicon-bonded OH groups, and the oligomer is coated on the ceramic particles prior to forming the slip to be cast, the slip viscosity is lowered compared to that of a slip containing untreated particles, or the siloxane monomer as a coating material.

As stated above, in copending U.S. Ser. No. 07/851,610, now U.S. Pat. No. 5,252,655, a hydrolyzed siloxane was used as an addition to a ceramic slurry used to make green tape for the production of multilayer ceramic packages. The teachings of U.S. Ser. No. 07/851,610 are incorporated herein by reference thereto as if fully set forth herein.

It is, therefore, a general object of this invention to provide a castable slip of ceramic powder in a suspension of a matrix polymer, with 0–40% of a plasticizer for the matrix polymer, each incapable of reacting with the organofunctional group of a trialkoxy silane, such matrix polymer being selected from the group consisting of polyvinyl alcohol ("PVA") copolymers, vinyl polymers and polyvinylpyrrolidone copolymers; in combination with of about 0.02 to about 2 wt. %, based on the weight of ceramic particles, of the aforesaid polysiloxanol oligomer; to provide a slip in which the matrix polymer is present in the range from about 2 to 20 wt. % of the slip, and in which the order of mixing of the ingredients does not substantially affect the rheology of the slip or the tape formed, including the tape's density, tensile strength, yield behavior, flexibility or ductility; and, to permit the use of a specified excess of the polysiloxanol oligomer (dispersant) chains which migrate towards the interface of the slip and a synthetic resinous, typically polyester, belt on which the slip is cast, and upon autocondensation during drying at a temperature sufficiently high to evaporate essentially all solvent, produces polysiloxane chains, generated in situ, having relatively fewer OH groups per unit weight of Si—O-containing polymer than those present per unit weight of oligomer. During sintering, these polysiloxane chains appear to function as a high temperature adhesive for successive circuitized cards in a stack.

Aminosilanes are known to undergo autocatalyzed hydrolysis with a proton source. Upon hydrolysis, the di- or trialkoxysilane silane is at least partially hydrolyzed to yield an alcohol and the corresponding silanol which, in turn, at least partially condenses to form mixtures of oligomers containing siloxane linkages and having OH groups attached to some of the Si atoms. Such oligomers are thought to have not only generally linear chains, and some cross-linked lattices, but also cage structures formed in solution and on the surfaces of particles to which the oligomer becomes attached.

The condensation, for example, in acidic aqueous media takes place over a period of time, which is controlled so as to ensure that plural silicon-bonded OH groups remain on the majority of the oligomer chains. It is these OH groups which provide sites for at least partial reaction with OH and other groups believed to be present on the surfaces of the metal oxide, ceramic and glass frit particles. However, for the effectiveness which distinguishes the effect of the oligomer over that of the monomer, as evidenced by the difference in sediment densities, inter alia, such oligomerization must be realized in the absence of the particles.

When a neat silane monomer is used in a concentration in the range from 0.02 to 2 wt. % of ceramic powder, there is essentially no oligomerization because the monomer concentration is too low for a statistically significant chance of condensation polymerization. Hence, the necessity for prehydrolysis with controlled oligomerization.

The oligomer is prepared by controlled hydrolysis of a trialkoxysilane, or, a mixture of trialkoxysilanes of the formula R"Si(OR')3 wherein R" represents an organofunctional group, and R' represents a lower C1–C4 alkoxy group, particularly methoxy, ethoxy, isopropoxy and n-butoxy. A mixture of trialkoxysilanes may be used resulting in a mixture of silanetriols as well as different alcohols. It is preferred to hydrolyze only one of the three alkoxy groups of the trialkoxysilane so as to generate substantially linear chains of oligomer to provide the requisite silicon-bonded OH groups and minimize crosslinking. Hydrolysis to yield a major proportion of the triol results in gelation. Most preferred are chains having a number average distribution with a number average degree of polymerization $X_n$ in the range from about 3 to about 10, most preferably about 5 to 8. The approximate mol weight of a molecule (chain) of an oligomer can be calculated from a knowledge of the structure of the monomer. It is such chains which are most preferred to produce substantial enhancement of sediment density. The preferred siloxanol oligomer has at least one OH group per oligomer molecule, and the preferred oligomer is substantially completely both water soluble and soluble in methanol and ethanol. The oligomer is preferably prepared from a trialkoxysilane monomer with an equimolar amount of water, or a slight excess. The greater the excess of water used, the greater the risk of an unacceptably high degree of crosslinking in the oligomer.

The prehydrolyzed form is more reactive than the monomeric form. Unlike its monomeric counterpart, the prehydrolyzed form is also soluble in ethanol or water. The range of solubilites make the prehydrolyzed form :more amenable to incorporation in a wide variety of processing schemes. The treated powder can be readily dispersed in organic solvents such as toluene, ethanol, MIBK and mixtures thereof. In addition, the surface species have been found to remain adsorbed even after refluxing in ethanol and toluene.

In a particular example, 48 parts Z6020 (N-2-aminoethyl-3-aminopropyltrimethoxysilane from Dow Corning), 48 parts methanol and 4 parts water by weight are held for from about 0.25 to 4 hours depending upon the temperature of the reaction mixture. This temperature is maintained in the range from about 20° C. to about 40° C., preferably from about 20° C. to about 30° C., and most preferably at about 25° C. Sufficient trialkoxysilane is hydrolyzed when the initially two-phase liquid mixture is converted to a single liquid phase, unless the monomer is miscible from the start, in which case some other means for determining the degree of hydrolysis should be used, such as following the reaction with $Si^{29}$ in solution NMR analysis. The hydrolysis reaction may be allowed to continue until noticeably viscous, indicating an oligosiloxane has been formed.

Another silane; namely Z6032, is hydrolyzed at room temperature (20° C.) by mixing 100 parts Z6032, 25 parts water and 5 parts glacial acetic acid catalyst. Still another silane; namely, n-octyltriethoxy silane ("NOSi") (Huls America), is hydrolyzed at room temperature (20° C.) by mixing 48 parts NOSi, 48 parts methanol, 4 parts water and 1 part glacial acetic acid catalyst.

The hydrolysis of a single molecule of a trialkoxy silane may be represented as:

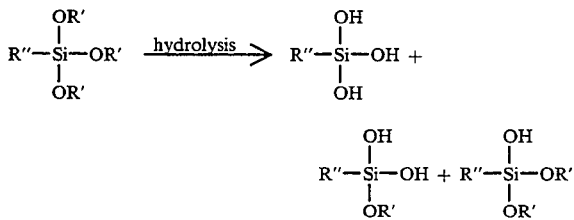

depending upon whether all three, or only two, or only one of the three alkoxy groups is hydrolyzed.

Upon oligomerization, chains having different structures are formed, depending upon the number of OH groups on the individual monomer molecules after hydrolysis. A typical chain has the structure:

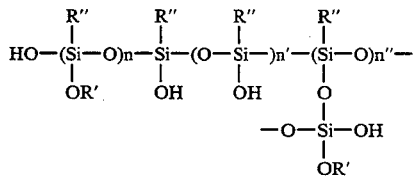

where $n+n'+n'' <200$, where $n' \geq 1$ is either a terminal or internal group, and $n''$ is sufficiently small to prevent gelation, so that though some crosslinking probably occurs, the degree to which this occurs is believed to be relatively slight.

In addition, smaller chains may be formed having one or more OH groups but as few as two repeating units, and some single molecules with at least one OH group may survive, depending upon the conditions of hydrolysis. Some molecules may have no OH groups remaining, as for example when two monohydroxy silanol molecules condense as follows:

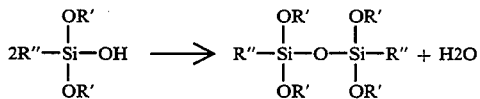

It will be appreciated that there is no known method for determining the exact structure of the oligomers since a distribution of the oligomers is actually formed by hydrolysis of trialkoxy silanes. The choice of the organofunctional group R" of a silane used depends upon the matrix polymer and plasticizer used, and to a lesser extent upon the particular oxide particles used. The organofunctional group R" may be vinyl, $C_6-C_{20}$ alkyl such as n-octyl silane or haloalkyl such as chloropropyl; epoxy such as Z6040; methacrylate such as Z6030; a primary $C_3-C_8$ amine such as A1100 (Union Carbide); a $C_4-C_{10}$ diamine such as Z6020; mercapto $C_2-C_8$ alkyl; and cationic styryl such as Z6032. Most preferred is an aminofunctional group having the formula

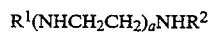

wherein:

$R^1$ is a divalent hydrocarbyl group such as alkylene exemplified by $—CH_2—$, $—CH_2CH_2—$, $—CH_2CH_2CH_2—$, $—CH_2CH_2(CH_3)CH_2—$ and $—(CH_2)_4—$; or alkylenearylene such as $—(CH_2)_2(C_6H_4)—$ $R^2$ is a monovalent hydrocarbyl group or H; and
$a$ is an integer in the range from 0 to 3.

The viscosity of the hydrolyzed siloxane (oligomer) at 25° C. may range from 5 to 106 centistokes, preferably from 100 to 10,000 centistokes.

Only enough oligomer to cover the surfaces of the particles will provide the desired enhanced sediment density. This amount will generally range from about 0.1 to about 0.5 wt. % of the powder, typically about 0.2 wt. %, though as little as 0.02 wt. % will show a noticeable improvement in sediment density, arid up to 1.5 wt. % may be used to ensure coverage. The exact amount needed will depend on the number of reactive surface sites, surface area, and hence powder type.

Ceramic powders used include alumina, chromia, aluminum silicate, cordierite, mullite, spinel, forsterite, barium titanate, magnesium silicate, steatite, titanium dioxide, zircon, zirconium dioxide, and the like, and combinations thereof. Most preferred is alumina.

The castable slip of this invention is specific to the desired end product; namely, a multilayer ceramic (MLC) or stack, and is characterized by having a relatively low amount of matrix polymer, from about 3 to 20 wt. %, typically from 5-10 wt. % of the slip. To provide a suitable slip with such a high solids content, the choice of matrix polymer is of far greater importance than in other castable slips which have uses other than to form a stack. The relatively low proportion of matrix polymer is essential to provide reproducible shrinkage in dimensionally stabilized sheets cut from the green tape and minimum interference of the decomposed matrix polymer when a stack of sheets is fired. The importance of dimensional stability of the green sheets and how such stability is attained is set forth in U.S. Pat. No. 5,207,968, the disclosure of which is incorporated by reference thereto as if fully set forth herein.

The polymer matrix is typically chosen from a homopolymer of a vinyl aromatic monomer, such as polystyrene; a copolymer of a vinyl aromatic monomer with a mono- or diolefinically unsaturated comonomer, either diblock, triblock or random block, such as poly(styrene-co-acrylonitrile), polystyrene-co-butyl acrylate, ethylene-co-butylene, or poly(acrylonitrile-co-butadiene-co-styrene); a homopolymer of a C1-C5 alkyl acrylate or methacrylate, such as poly(isobutylmethacrylate)

("PIBM"), poly(methylmethacrylate) ("PMMA"), poly(n-butyl or isopropyl)methacrylate; or a copolymer of polyvinylalcohol ("PVA"), such as PVA-co-vinyl acetate, PVA-co-vinyl acetate-co-vinyl butyral ("PVB"), PVA-co-ethylene, PVA-co-PVC-co-vinyl acetate.

The preferred matrix polymers are those having a mol weight in a range such that a doctorable and castable slip is produced which preferably has a shear viscosity in the range from about 1 Pa-sec to about 20 Pa-sec at a dynamic shear rate of 20 sec-1.

Excess oligomer does not react with the OH groups on the surfaces of particles of the ceramic powder. When dried to remove solvent, preferably at a temperature in the range from about 40° C. to about 200° C., and under reduced pressure (vacuum), the relatively short and mobile polysiloxanol chains are autocondensed into relatively long polysiloxane chains which are not as mobile. The concentration of the siloxane groups near the surface of the interface is confirmed by FTIR analysis. Not only is the tensile strength of the green improved due to such autocondensation of oligomer chains, but also the adhesion of one green to another, as measured by the "pull-strength" of test samples with, and without oligomer, which samples have been made by laminating two "coupons" each 2.54 cm×2.54 cm, "dull" surface to "shiny" surface.

A castable slip typically contains from 60% to 80 wt. % of ceramic powder. Alumina is typically the major constituent of a ceramic powder, but any oxide ceramic and any inorganic sinterable material usually characterized as a "glass-ceramic" (or more familiarly "glass") may be used. Glass-ceramic materials are characterized as devitrified or crystallized forms of glass, the properties of which may vary over a wide range. They are sintered through the controlled, in situ crystallization of a glass body of proper composition brought about by controlled heat-treatment so as to act as a flux for the much higher melting oxide ceramic particles in the ceramic powder. The glass generally includes nucleating agents such as the oxides of titanium zirconium, phosphorus, magnesium, tin and the like. The use of "glass" in a MLC allows it to be tailored to have a coefficient of expansion which closely matches that of alumina, chromia, etc., and the dielectric constants can be tailored to a suitably low value, thereby improving and increasing the speed of the electronic device.

Though the foregoing tests did not include any surfactants such as wetting agents, a commercial formulation of binder would typically contain one or more surfactants. A surfactant helps to wet the surfaces of the ceramic particles by reducing the interfacial tension between the particles and the polymer solution, and helps form a stable suspension of the ceramic powder, therefore a desirably castable slip. By "stable suspension", we refer to one which shows essentially no measurable stratification of densities over a period of at least 12 hours, more preferably, from 3-7 days. The plasticizer in the solution provides flexibility to the green tape and the green cards. Specific binders and plasticizers are mentioned hereinabove only because these are currently in use for making green, but any suitable binder may be used provided it has film-forming properties, is non-volatile at the drying temperature of the cast slip, and compatible with the oligomer chosen and the constituents of the ceramic powder. The general technology for preparing a slip with a suitable binder is old and well known, having been disclosed in U.S. Pat. No. 2,966,719, the disclosure of which is incorporated by reference thereto as if fully set forth herein.

A method for producing a hermetically sealed stack comprises (a) dispersing a ceramic powder in an anhydrous solvent, the coated ceramic powder consisting essentially of a major portion by weight of particles in the size range from 3–10 $\mu$m and a minor portion by weight of particles in the size range from about 0.5–3 $\mu$m, the coating is in the presence of from 0.05–0.5 wt. % of a polysiloxanol oligomer; (b) mixing the dispersion with a solution of a matrix polymer and plasticizer for the matrix polymer to produce a stable suspension; (c) casting a doctorable slip of the stable suspension, having a thickness in the range from about 2 mils (0.002 inch) to 100 mils (0.141 ), preferably 5 mils (0.005 inch) to 50 mils (0.050"), most preferably 6–12 mils, on a moving, preferably synthetic resinous surface to which the slip's lower surface is removably adhered, the slip having a density in the range from 45–60% of theoretical, and removing the solvent by evaporation to form a green sheet having an interfacial zone containing at least twice as great a concentration of polysiloxane chains generated in-situ by condensation of the oligomer, as that in the slip's upper surface; (d) removing the green sheet having less than 1 wt. % of the solvent; (e) dividing the green sheet into cards of predetermined dimensions, and stabilizing the cards; (f) depositing, preferably by screen printing, a conductive metal or metal oxide paste onto more than one of the cards to form a circuitized card; (g) stacking from 2 to about 20 circuitized cards coextensively in one-to-one correspondence to form a stack, and subjecting the stack to a pressure sufficient to adhere the cards to each other while maintaining the integrity of vertically spaced-apart circuits (referred to as "metallurgy") in the stack; and, (h) treating the stack in a reducing atmosphere at elevated temperature and for a time sufficient to effect reduction of the paste and decomposition of the polymer matrix and plasticizer, whereby a hermetic seal between contiguous cards is simultaneously effected.

The best embodiment of a MLC of this invention is a hermetically sealed stack produced by the process described immediately hereinabove.

The benefit of the present invention is illustrated in the following examples. Examples 1 and 3 were performed for the purpose of comparison.

EXAMPLE 1

2000 grams of A-16 alumina powder, which is commercially available from Aluminum Company of America, was placed into a V-blender. The mixture was dry tumbled for approximately 2.5 hours. After mixing, the powder was placed into a stainless steel container and was heated in a vented oven at 190° C. for 4 hours. The powder was stirred occasionally.

The dry loose and packed density were determined by weighing the 100 ml sample, then subjecting the 100 ml sample to 400 taps from a STAV Stampvolumeter to determine the packing density of the powder. The dry loose packing density was recorded in the Table.

The dispersability of each powder was tested by performing settling tests on 43% solids slurries of treated and untreated powders in toluene. Equilibrium sediment volumes were obtained after 48 hours. These volumes were then divided by 3.98 g/cm$^3$ to give the density as a percentage of the theoretical density for alumina. In addition, the sedimentation density was recorded in the Table.

EXAMPLE 2

The process of Example 2 was repeated except that a methanol solution containing pre-hydrolyzed n-octyltriethosilane (NOSi-P) was added to the 2000 grams of A-16 alumina powder prior to blending. The NOSi-P was 47.6% active, and the total amount of NOSi-P was 1.7 wt. %.

The mixture was dry tumbled for approximately 2.5 hours. After mixing the powder was placed into a stainless steel container and was heated in a vented oven at 190° C. for 4 hours. The powder was stirred occasionally to insure that the methanol had an opportunity to volatilize. The dry loose and packed density were measured and recorded in the Table. In addition, the sedimentation density of the powder were determined as in Example 1 and recorded in the Table.

Surprisingly, the dry loose density of the treated sample of Example 2 was approximately 33% greater than the untreated material of Example 1. The packed density of the material of Example 2 was approximately 18% greater than the untreated material of Example 1. Higher packing density equates to savings in shipping costs. In addition, the material of Example 2 had a sedimentation density which was approximately 72% greater than the untreated material of Example 1. Those skilled in the art recognize that higher theoretical densities are generally indicative of less agglomeration and better dispersion stability.

The material of Example 2 was used in a ceramic slurry containing an acrylic binder. The presence the material was found to increase the sintering rate of the ceramic green body formed from the slurry. In addition, the product formed using the material of Example 2 did not adversely effect the dielectric properties of the fired product.

TABLE 1

| Example Number | Alumina | Loose Packing Density* | Density* | Sedimentation Density* |
|---|---|---|---|---|
| 1 | A-16 | 24 | 33 | 18 |
| 2 | A-16 | 32 | 39 | 31 |
| 3 | A-152 | 26 | 34 | 20 |
| 4 | A-152 | 33 | 40 | 47 |

*expressed as % of Theoretical Density

EXAMPLE 3

The procedure of Example 1 was repeated except that A-152 alumina powder, which is commercially available from Aluminum Company of America, was used in place of A-16 alumina. The total amount of NOSi-P needed to obtain the surface coverage was 0.74 wt. %. The dry loose and packed density were measured and recorded in the Table. In addition, the sedimentation density of the powder was determined as in Example 1 and recorded in the Table.

EXAMPLE 4

The procedure of Example 2 was repeated except that A-152 alumina powder, which is commercially available from Aluminum Company of America, was used in place of A-16 alumina. The total amount of NOSi-P needed to obtain the surface coverage was 0.74 wt. %. The dry loose and packed density were measured and recorded in the Table. In addition, the sedimentation density of the powder was determined as in Example 1 and recorded in the Table.

Surprisingly, the dry loose density of the treated sample of Example 4 was approximately 27% greater than the untreated material of Example 3. The packed density of the material of Example 4 was approximately 18% greater than the untreated material of Example 3. Higher packing density equates to savings in shipping costs. In addition, the material of Example 4 had a sedimentation density which was approximately 135% greater than the untreated material of Example 3. Those skilled in the art recognize that higher theoretical densities are generally indicative of less agglomeration and better dispersion stability.

The material of Example 4 was used in a ceramic slurry containing an acrylic binder. The presence the material was found to increase the sintering rate of the ceramic green body formed from the slurry. In addition, the product formed using the material of Example 4 did not adversely effect the dielectric properties of the fired product.

It is to be appreciated that certain features of the present invention may be changed without departing from the present invention. Thus, for example, it is to be appreciated that although the invention has been described in terms of a preferred embodiment in which alumina is coated with pre-hydrolyzed n-octyltriethosilane (NOSiP), the powdered materials comprehended by the present invention include any inorganic chemical. Powdered organic materials that may be used are ceramic particles including but not limited to the group consisting of alumina, chromia, aluminum silicate, cordierite, mullite, spinel, forsterite, barium titanate, magnesium silicate, steatite, titanium dioxide, zircon, zirconium dioxide, and combinations thereof.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

What is claimed is:

1. A method of reducing the agglomeration of ceramic powder materials, the method comprising:
    (a) providing a ceramic powder comprising ceramic particles;
    (b) coating said ceramic particles with an oligomer of a trialkoxysiloxane having the structure $Si(OR')_3$ wherein R' represents a lower $C_1$-$C_4$ alkoxy group selected from the group consisting of methoxy, ethoxy, isopropoxy and n-butoxy; and, wherein said oligomer has chains having a number average distribution with a number average degree of polymerization $X_n$ in the range above 2 but below the gel point; and
    (c) drying said ceramic powder.

2. The method of claim 1 in which said chains have a number average distribution with a number average degree of polymerization $X_n$ in the range from about 3 to 10.

3. The method of claim 1 in which said oligomer is pre-hydrolyzed n-octyltriethoxysilane.

4. The method of claim 1 in which said oligomer is present in an amount in the range from about 0.005 to about 5 wt. % of said ceramic powder.

5. The method of claim 1 in which said oligomer is present in an amount in the range from about 0.05 to about 2 wt. % of said ceramic powder.

6. The method of claim 1 in which ceramic particles are selected from the group consisting of alumina, chromia, aluminum silicate, cordierite, mullite, spinel, forsterite, barium titanate, magnesium silicate, steatite, titanium dioxide, zircon, zirconium dioxide, and combinations thereof.

7. The method of claim 1 in which said drying is performed at a temperature between about 40° C. and 200° C.

8. The method of claim 1 in which said drying is performed with agitation at a temperature greater than ambient temperature.

9. The method of claim 1 in which said drying is performed at a temperature greater than about 100° C.

10. The method of claim 1 in which said coating of ceramic particles is performed by:
adding said oligomer to said ceramic particles and dry mixing.

11. The method of claim 1 in which said coating of ceramic particles is performed by:
determining the amount needed to provide a monolayer coverage of the ceramic particles; and
adding said oligomer to said ceramic particles and dry mixing.

12. The method of claim 1 in which (a) includes providing a ceramic powder having at least 50% of its particles less than about 10 μm.

13. The method of claim 1 which further includes:
(d) incorporating said dried ceramic particles to a ceramic slurry.

14. The method of claim 1 which further includes:
(d) incorporating said dried ceramic particles to a ceramic slurry formed from a solvent selected from the group consisting of water, ethanol, toluene and methanol.

15. The method of claim 1 which further includes:
(d) incorporating said dried ceramic particles to a ceramic slurry; and
(e) forming said slurry into a green ceramic body.

16. The method of claim 1 which further includes:
(d) incorporating said dried ceramic particles to a ceramic slurry; and
(e) forming said slurry into a green ceramic body by a method selected from the group comprising extrusion, pressing, wet pressing, jiggering, ram pressing, injection molding, casting and doctor blading.

17. A method of reducing the agglomeration of ceramic powder materials, the method comprising:
(a) providing a ceramic powder comprising ceramic particles;
(b) coating said ceramic particles with a polysiloxanol oligomer of a trialkoxysiloxane monomer having the structure

wherein R' represents a lower $C_1$–$C_4$ alkoxy group selected from the group consisting of methoxy, ethoxy, isopropoxy and n-butoxy; and, wherein said oligomer has chains having a number average distribution with a number average degree of polymerization $X_n$ in the range above 2 but below the gel point;
(c) drying said ceramic powder; and
(d) incorporating said dried ceramic powder to a ceramic slurry.

18. The method of claim 17 which further includes:
(e) forming said slurry into a green ceramic body.

* * * * *

UNITED STATES PATENT AND TRADEMARK OFFICE
CERTIFICATE OF CORRECTION

PATENT NO. : 5,348,760

DATED : September 20, 1994

INVENTOR(S) : Anthony A. Parker, Edward M. Anderson and Todd T. Stanzione

It is certified that error appears in the above-indentified patent and that said Letters Patent is hereby corrected as shown below:

Col. 10, line 67    Change "0.005" to --0.05--.
Claim 4, line 2

Signed and Sealed this

Twenty-seventh Day of December, 1994

Attest:

BRUCE LEHMAN

*Attesting Officer*    *Commissioner of Patents and Trademarks*